3,086,895
SOLID COMPOSITE PROPELLANT CONTAINING ACETYLENIC POLYURETHANE AND PROCESS OF MAKING

Paul F. Schaeffer, Denville, and Donald D. Perry, Morristown, N.J., assignors to Thiokol Chemical Corporation, Trenton, N.J., a corporation of Delaware
No Drawing. Filed Nov. 5, 1958, Ser. No. 772,652
9 Claims. (Cl. 149—19)

This invention relates to high-energy, solid propellants, and more particularly to a novel class thereof, in which acetylenic polyurethanes form the essential fuel ingredients.

A principal object of this invention is to prepare high-energy compositions, possessing properties which adapt them for use as solid rocket propellants.

Another principal object is to provide a method of forming a solid propellant, which includes the steps of mixing chain-extending and cross-linking agents with an acetylenic ether polymer, and adding a solid oxidizer to the mixture prior to curing the composition.

Another object is to provide a solid propellant which possesses high safety characteristics, with reference to impact sensitivity, autoignition temperature, and stability upon storage.

Another object is to provide a solid propellant which exhibits a high specific impulse.

Another object is to provide a method of preparing a high-energy, solid propellant, the burning rate of which can be predetermined, regulated or controlled within a wide range of burning rates.

Still another object is to provide a solid propellant, the mechanical properties of which can be readily regulated or adjusted by modifications in the make-up of its fuel-binder component.

Other objects and advantages of our invention will appear as the description thereof proceeds.

The actylenic polyurethanes, employed in the practice of the present invention, are described and claimed in the pending application of Donald D. Perry et al., Serial No. 669,912, filed July 1, 1957. They are made by reacting acetylenic ether polymers of low molecular weights, and containing hydroxyl end groups, with diisocyanates and cross-linking agents.

In the present description we usually shall designate one of our acetylenic ether polymer starting materials as a polyacetal; meaning thereby a polymeric reaction product of an acetylenic glycol and an aldehyde or aldehyde derivative. Examples of polyacetals, which we may use in the practice of this invention, are poly(2-butyne-1,4-dioxymethylene, poly(2-butyne-1,4-dioxyethylidene), and poly(2,4-hexadiyne-1,6-dioxymethylene). In the illustrative tests under Example I below, our use of the term "polyacetal," unless otherwise identified, means poly(2-butyne-1,4-dioxymethylene).

In our practice of this invention we integrate additional steps with those involved in the formation of the polyurethanes. These additional steps comprise essentially, incorporating with the polyurethane-forming mix, at the start of the cross-linking reaction, a solid oxidizer in an amount sufficient to render the mix doughy or putty-like, casting this material into a mold, and curing to form a solid propellant grain.

Our preferred method of preparing our novel propellants is the following:

A quantity of a polyacetal, of molecular weight from about 800 to 3000, is melted in a reaction vessel. An aromatic or aliphatic diisocyanate is added in 30 percent to 50 percent excess, on a 1:1 molar basis. The mixture is heated for 10 to 30 minutes at 45° to 110° C. Then a cross-linking agent, such as an aliphatic diamine, amino alcohol, or polyfunctional alcohol, is added. The amount of cross-linking agent may be varied, but should not exceed the total quantity of available isocyanate groups—that is, the isocyanate groups in excess of the hydroxyls present in the original polyacetal.

Immediately after the addition of the cross-linking agent the oxidizer is mixed in. At the same time a small amount of ferric acetylacetonate (0.01 to 0.1 percent) also may be added. The viscous, dough-like mix then is poured into a mold, and cured for 4 to 168 hours at 40° to 140° C.

Our studies have shown that our preferred oxidizer, ammonium perchlorate, tends to inhibit the chain-extending and cross-linking reactions in the propellant mixture. This inhibiting action was overcome by the ferric acetylacetonate, which decreased the curing time, and yielded compositions with improved flexural and elastic properties.

In brief, our novel propellant composition is a combination in the patent sense, involving the functional interrelation of two basic components—a fuel binder and an oxidizer. The essential starting materials for the fuel binder are a polyacetal (illustrated above), a diisocyanate, and a cross-linking agent. Our functional additives, which may be included in the binder, are one or more members of the class consisting of antioxidants, plasticizers, and wetting agents. Examples of these additives will appear in test formulations to be described hereinafter.

Listed below are examples of agents which may be used to function in a designated manner in the practice of our invention.

DIISOCYANATES 2,4-toluene diisocyanate;
80:20 mixture of 2,4- and 2,6-toluene diisocyanate;
Dianisidine diisocyanate;
Hexamethylene-1,6-diisocyanate;
4,4'-diisocyanatodiphenylmethane; and
3,3'-bitolylene-4,4'-diisocyanate.

CROSS-LINKING AGENTS

Dihydroxyethylethylenediamine;
Ethanolamine;
Hexamethylenediamine;
1,2,6-hexanetriol;
4,4'-methylene-bis(2-chloroaniline);
Trimethylolpropane;
Tris(hydroxymethyl)-nitromethane;
Castor oil (glyceryl triricinoleate).

OXIDIZERS

In addition to ammonium perchlorate and ammonium nitrate, other inorganic oxidizers, which may be used in forming the hereindescribed propellant compositions, are aluminum chlorate and perchlorate, and the chlorates, nitrates, and perchlorates of the alkali metals and of the alkaline earth metals.

PLASTICIZERS

Butylcarbitol pelargonate; and
Isodecyl pelargonate.

Each of the following lettered tests under Example I embodies the aforedescribed preferred method of preparation of our novel propellants; and the description of each test is intended to be read and understood as incorporating therein by reference the substance of our preferred method.

*Example I*

(A) *Fuel binder.*—Polyacetal, 1 mol; 2,4-toluene diisocyanate, 1.5 mol; and trimethylolpropane, 0.2 mol.

Oxidizer: Ammonium perchlorate, mixed with 0.5 percent of copper chromite, based upon the weight of ammonium perchlorate.

The fuel binder (29.6 parts by weight) was processed with 70 parts by weight of oxidizer. The composition cured overnight to a Shore A-2 hardness of 79 to 84.

Strands of one-eighth inch diameter were cut from rectangular slabs of this product. A Crawford-type solid propellant strand burner was used in determining the burning rates of the strands, at 70° F., under nitrogen pressures from 500 to 2500 p.s.i.g. The observed burning rates, in inches/second, at given pressures are tabulated in the two lines next below:

| Pressure (p.s.i.g.) | 500 | 1,000 | 1,500 | 1,800 | 2,000 | 2,500 |
|---|---|---|---|---|---|---|
| Burning rate | 0.42 | 0.55 | 0.65 | 0.64 | 0.63 | 0.72 |

At pressures in the range from 1500 to 2000 p.s.i.g. the strand burning rate is substantially constant. When the burning rates are plotted against pressures, the resulting curve exhibits a plateau at 1500 to 2000 p.s.i.g. The importance of this plateau will be brought out hereinafter.

(B) The compositions of fuel binder and of oxidizer were the same as those in test (A). The fuel binder (21.7 parts by weight) was processed with 78.8 parts by weight of oxidizer. A wetting agent, Triton X-100 (1.0 percent by weight, based upon the combined weights of fuel binder and oxidizer) was incorporated with the propellant composition prior to the curing step. The materials were blended in a sigma blade mixer, then molded and cured for 16 to 20 hours without pressure—all at 80° C.

Triton X-100 is a tradename for a polyethylene glycol alkyl aryl ether. As an additive it appears to allow greater amounts of oxidizer to be incorporated with the fuel binder, and to decrease the curing rate of the propellant, so that curing does not speed to completion in the mixer.

The product in this test (B) cured to a leathery material, with good elongation. Its initial Shore A-2 hardness was 71 to 80, and its D hardness 24 to 30. Observed strand burning rates of this composition, in inches/second at various bomb pressures, were:

| Pressure (p.s.i.g.) | 100 | 500 | 800 | 1,000 | 1,200 | 2,000 |
|---|---|---|---|---|---|---|
| Burning rate | 0.40 | 0.61 | 0.75 | 0.77 | 0.80 | 0.79 |

Here the burning rate-pressure curve exhibits a plateau at 800 to 2000 p.s.i.g.

(C) The processing data of this test were the same as those of test (B), except that 19.5 parts by weight of fuel binder were processed with 81.0 parts by weight of oxidizer. The composition cured to a strong, dense material. Its initial Shore A-2 hardness of 92 to 99, and D hardness of 60 to 66 did not change significantly during an aging period of 11 days at ambient temperatures. Observed strand burning rates of this composition, in inches/second, were:

| Pressure (p.s.i.g.) | 100 | 500 | 800 | 1,000 | 1,200 | 2,000 |
|---|---|---|---|---|---|---|
| Burning rate | 0.27 | 0.64 | 0.74 | 0.74 | 0.71 | 0.99 |

Here the burning rate-pressure curve exhibits a plateau at 800 to 1200 p.s.i.g.

(D) In this test processing was begun with a fuel binder and an oxidizer of the same compositions as those employed in test (A); the parts by weight, however, of fuel binder and oxidizer, being 19.6 and 80.4, respectively. The following additives also were incorporated with the propellant composition prior to curing—each in percent by weight of the combined fuel binder and oxidizer: Ionol, 2.5 percent; isodecyl pelargonate, 2.75 percent; and Triton X-100, 2.5 percent.

Ionol is a tradename for 2,6-di-tert.-butylparacresol. Its function was as an antioxidant stabilizer.

The isodecyl pelargonate was employed as a plasticizer. It use as an additive permits processing of our propellant formulations at oxidizer concentrations up to 83.5 weight percent. In the present test the composition cured to a dense material. Its burning rate-pressure curve exhibited a plateau between 1000 and 2000 p.s.i.g.—at a burning rate of approximately 1.2 inches per second.

This test (D) was repeated in most respects, except that the proportions of additives were reduced—as follows: Ionol, 1.0 percent; isodecyl pelargonate, 1.5 percent; and Triton X-100, 0.5 percent. The composition cured to a hard, dense propellant. Strand burning rates were substantially the same as those observed with the first product of this test; and the burning rate-pressure curve exhibited a plateau at 800 to 2000 p.s.i.g.

*Burning rate-pressure curves.*—In the tests described under Example I we have emphasized the plateau within a defined range of bomb pressures, which characterized each burning rate-pressure curve. We consider this plateau to represent a highly important property of our novel propellant compositions, which can be employed to great advantage in designing a solid propellant motor; for it minimizes variations in burning rate in the presence of large fluctuations in pressure.

Another important advantage of our compositions is the wide range of burning rates (from about 0.5 inch to 2.2 inches per second at 1000 p.s.i.g.), which we have been able to obtain by the use of catalysts, and by varying the O/F (oxygen:fuel) ratios from 1.9 to 5.0.

*Safety tests.*—These tests of our polyurethane propellants were directed to their handling characteristics, more particularly to (1) impact sensitivity, (2) detonation, (3) autoignition temperatures, and (4) stability upon storage.

The impact sensitivity of the propellant, when tested with a 2-kg. weight in the Picatinny Arsenal impact tester, was found to be approximately the same as that of pure ammonium perchlorate (9 to 12 inches).

The results of detonation tests, made with a No. 8 blasting cap and 20 grams of tetryl, indicated that the propellant is not sensitive to detonation.

Ignition temperature data were obtained, using the standard 5-second test. (Picatinny Arsenal Technical Report No. 1401, Rev. 1.) Autoignition values (no ignition in 3 minutes) for our propellants lie in the range from 180° to 200° C.

Propellant samples have been stored at 80° C. for periods up to 30 days without any signs of degradation or of change in their physical properties.

*Tensile strength.*—Measurements of this property were made on a 5000 pound capacity Baldwin-Tate-Emery Testing Machine, Type PTF 101. The tensile strengths of the products of tests (A), (B), and (C) above were the following:

(A) 138 p.s.i. at a loading rate of 0.5 inch/minute; elongation, 7.7%.

(B) 91 p.s.i. at a loading rate of 20 inches/minute; elongation, 42 percent.

(C) 605 p.s.i. at a loading rate of 20 inches/minute; elongation, 14 percent.

*Specific impulse.*—In the case of high-energy propellant systems, operating at a high chamber pressure, such as the aforedescribed embodiments of our invention, theory suggests that there would be a substantial degree of chemical recombination in the exhaust. Consequently, the assumption of mobile equilibrium of exhaust products was considered to prove a more accurate basis for computing specific impulses. A rigorous, longhand method of computing specific impulses has included this assumption of such a mobile or shifting equilibrium in the exhaust.

Theoretical calculations of the specific impulse of an acetylenic polyurethane propellant, such as that described in test (C) above, have yielded values of the order of 251 lbf.-sec./lbm. at 1000 p.s.i. Such values are significantly higher than those for solid propellants in which conventional fuel binders are employed. A special advantage inhering in our acetylenic polyurethane fuel binders over the fuel binders of the prior art lies in the high energy of the internal triple bond.

It is to be understood that modifications and changes in detail in the aforedescribed means and method steps may be made without departing from the spirit of our invention; and that all exemplifications and variants of our novel methods and of the new products thereof, set forth hereinabove, are intended to be illustrative only, and in no sense limitative of the invention other than as the same is defined in the accompanying claims.

What is claimed is:

1. The method of forming a solid propellant comprising an acetylenic polyurethane fuel which comprises, melting in a reaction vessel a quantity of an acetylenic polyacetal, mixing with the melt an excess of about 30 percent to 50 percent, on a 1:1 molar basis, of an organic diisocyanate, heating the mixture for 10 to 30 minutes at 45° to 110° C., adding thereto a cross-linking agent in an amount not to exceed the quantity of isocyanate groups in excess of the hydroxyls present in the original polyacetal; incorporating in the mixture a solid inorganic oxidizing salt in an amount sufficient to yield an O/F ratio from about 1.9 to about 5.0, and from about 0.01 percent to 0.1 percent by weight of ferric acetylacetonate, casting the mix into a mold, and curing it for 4 to 168 hours at 40° to 140° C.

2. The method as defined in claim 1, wherein the polyacetal is a condensation product of an acetylenic glycol and an aldehyde.

3. The method as defined in claim 1, wherein the polyacetal is a member of the group consisting of poly(2-butyne-1,4-dioxymethylene), poly(2-butyne-1,4-dioxyethylidene), and poly(2,4-hexadiyne - 1,6 - dioxymethylene).

4. The method as defined in claim 1, wherein the diisocyanate is a member of the group consisting of 2,4-toluene diisocyanate, dianisidine diisocyanate, hexamethylene-1,6-diisocyanate, 4,4'-diisocyanatodiphenylmethane, and 3,3'-bitolylene-4,4'-diisocyanate.

5. The method as defined in claim 1, wherein the cross-linking agent is a member of the class consisting of di-hydroxyethylethylenediamine, ethanolamine, hexamethylenediamine, 1,2,6-hexanetriol, 4,4'-methylene-bis(2-chloroaniline), castor oil, trimethylolpropane, and tris(hydroxymethyl)-nitromethane.

6. The method as defined in claim 1 plus the step of adding to the mix, prior to curing, about 1.0 percent by weight of the mix of a polyethylene glycol alkyl aryl ether.

7. The method as defined in claim 1 plus the steps of adding to the mix, in percent by weight thereof, about 2.5 percent of 2,6-di-tert-butylparacresol, and about 2.75 percent of isodecyl pelargonate.

8. The method as defined in claim 1, wherein said oxidizing salt is a member of the class consisting of aluminum chlorate, aluminum perchlorate, ammonium perchlorate, ammonium nitrate, and the chlorates, nitrates, and perchlorates of the alkali metals and of the alkaline earth metals.

9. A solid propellant composition consisting essentially of an acetylenic polyurethane fuel and of a solid inorganic oxidizing salt in such proportions that the ratio of oxidizer to fuel is between about 1.9 and about 5.0.

References Cited in the file of this patent

UNITED STATES PATENTS

| | | |
|---|---|---|
| 2,622,277 | Bonell et al. | Dec. 23, 1952 |
| 2,855,372 | Jenkins et al. | Oct. 7, 1958 |

OTHER REFERENCES

Blatz: Industrial and Engineering Chemistry, vol. 48, No. 4, April 1956, pp. 727–8.

Arendale: Industrial and Engineering Chemistry, vol. 48, No. 4, April 1956, pp. 725–6.

Noland: Chemical Engineering, May 19, 1958, p. 155.

Zaehringer: "Solid Propellant Rockets, Second Stage," American Rocket Co., Box 1112, Wyandotte, Mich., September 1958, pp. 209–212.